(No Model.)

J. R. MAXWELL.
VALVE AND UNION.

No. 291,066.  Patented Jan. 1, 1884.

WITNESSES:

James R. Maxwell
INVENTOR by James N. See.
ATTORNEY

UNITED STATES PATENT OFFICE.

JAMES R. MAXWELL, OF CINCINNATI, OHIO.

VALVE AND UNION.

SPECIFICATION forming part of Letters Patent No. 291,066, dated January 1, 1884.

Application filed April 27, 1883. (No model.)

*To all whom it may concern:*

Be it known that I, JAMES R. MAXWELL, of Cincinnati, Ohio, have invented certain new and useful Improvements in Valves and Unions, of which the following is a specification.

This invention pertains to valves and unions for use in connection with pipes, tubes, and conduits.

The object of the invention and its nature will be understood from the description hereinafter contained.

Figure 1:
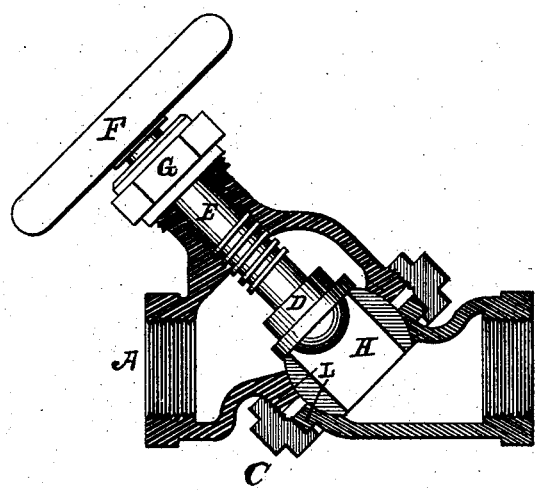
Figure 2:
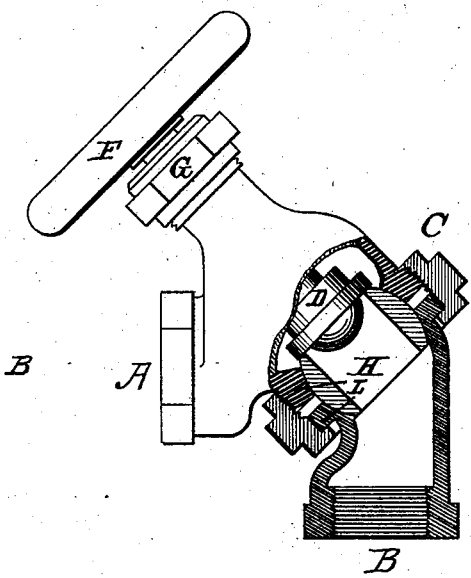

In the accompanying drawings, Figure 1 exhibits in section a valve and union embodying my improvements. Fig. 2 exhibits, partly in section and partly in elevation, the same structure, differently disposed; and Fig. 3 exhibits in section a modified structure involving my improvements.

A is a socket fitted to be screwed upon the end of a pipe; B, a similar socket.

L L are the adjoining ends of the sockets, arranged at an angle, as shown, one of the ends L being flanged and the other threaded; C, a union-nut to unite the sockets; D, a valve; E, the valve-stem; F, the hand-wheel to revolve the stem; G, the stuffing-box for packing the stem; H, a valve-seat with a spherical outer surface.

The structure will be seen to possess the features and functions of ordinary globe-valves, with the valveway arranged diagonally. The union-nut C, in an obvious manner, permits the structure to be separated into two parts and to serve the purpose of a pipe-union. The union device, being loosened, permits the socket B to be turned with its axis at right angles to the axis of the other socket, as shown in Fig. 2. This permits the structure to be used as a fitting for straight pipes or for pipes arranged at an angle. The seat H, being separable and of simple form, permits the use in its construction of hard, durable material. The valve-receiving face of the seat and its spherical exterior permits of surfacing by grinding-wheels, and thus renders possible the use of material too hard to be acted on by cutting-tools. The valve-seat, having a spherical exterior, bearing steam or liquid tight against the inner surfaces of the sockets, acts as the packing for the union and at the same time permits certain flexations or variations in the position or alignment of the pipes to which it is joined. The seat is also adapted, by reason of its spherical form, to adjust itself to receive the valve D fairly and squarely, even if the valve D be fixed rigidly to its stem. The separation of the structure at the union-joint permits the insertion of the stem and its attached valve from the rear, the wheel F being removed, of course, and this permits the nose, through which the stem works, to be cast solid upon the socket instead of being screwed in place, as usual. The nose may, however, be screwed in place, if desired, and any other form of valve and stem may be employed which will answer the purpose.

Figure 3:
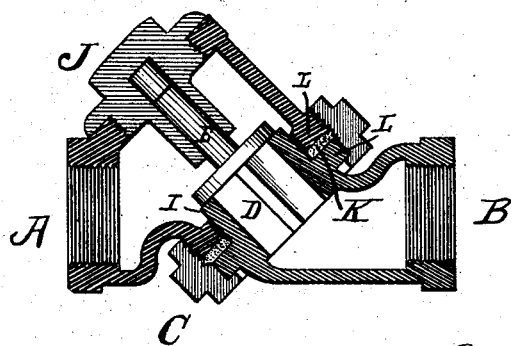

Fig. 3 exhibits the structure modified to form a check-valve. In this modified structure the cap J is screwed in place and is removable to give access to the valve. The valve-seat is also modified, being formed upon the socket B instead of being a separable inserted valve-seat, as in Figs. 1 and 2. In this case a gasket, K, is placed between the socket-faces, and the valve-seat portion I projects into the opposite socket-piece and forms the dowel for the union. The union, instead of being formed by means of a threaded union-nut, as shown, may be formed by flanges united by bolts, and the pipe-receiving devices may be flanged or spigoted.

I do not confine my invention to the details set forth, but contemplate that many modifications may be employed. I have simply explained the principle of my invention and have fully explained the best mode in which I contemplate applying that principle.

Valve-seats have been provided with square and beveled shoulders arranged to be engaged by union-clamps; but I know of no valve-seats having the spherical exterior and self-adjusting quality inherent in my construction.

I claim as my invention—

1. A valve-body formed with two parts fitted to connect with pipes and united to swivel with reference to each other upon an axis disposed at an angle to the plane or planes occupied by the pipes, which may be connected by such valve-body.

2. A valve-body having its nose formed integral with one of its pipe-receivers and having its other pipe-receiver separably joined by a swiveling union.

3. A valve-body having its nose formed integral with one of its pipe-receivers and having its other pipe-receiver separable in a plane at an angle to the axis of both pipe-receivers.

4. Two pipe-receivers, a means for uniting them, and a spherical ring seating against said receivers to pack the joint and give flexibility to the union, substantially as set forth.

5. A valve-body combined with a separable seat, having a spherical exterior, seating in said valve-body.

JAMES R. MAXWELL.

Witnesses:
J. W. SEE,
ISRAEL WILLIAMS.